(12) United States Patent
Mainali et al.

(10) Patent No.: US 10,901,648 B2
(45) Date of Patent: Jan. 26, 2021

(54) DISTRIBUTED DATA STORAGE SYSTEM WITH AUTOMATIC SNAPSHOTS, USER SNAPSHOTS AND SOFT DELETE

(71) Applicant: Microsoft Technology Licensing, LLC, Redmond, WA (US)

(72) Inventors: Shane Kumar Mainali, Redmond, WA (US); Quan Zhang, Kenmore, WA (US); Kaviyarasan Rajendran, Redmond, WA (US); Sundar P. Subramani, Redmond, WA (US); Andrew Edwards, Redmond, WA (US); Maneesh Sah, Redmond, WA (US); Krisjan David Fritz, Redmond, WA (US); Michael Hauss, Seattle, WA (US); Jianhua Yan, Redmond, WA (US); Michael Roberson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 16/202,283

(22) Filed: Nov. 28, 2018

(65) Prior Publication Data

US 2019/0339873 A1 Nov. 7, 2019

Related U.S. Application Data

(60) Provisional application No. 62/667,864, filed on May 7, 2018.

(51) Int. Cl.
*G06F 12/00* (2006.01)
*G06F 3/06* (2006.01)
*G06F 16/22* (2019.01)

(52) U.S. Cl.
CPC .............. *G06F 3/065* (2013.01); *G06F 3/067* (2013.01); *G06F 3/0619* (2013.01); *G06F 16/2282* (2019.01)

(58) Field of Classification Search
None
See application file for complete search history.

(56) References Cited

U.S. PATENT DOCUMENTS

| 9,736,243 B2 | 8/2017 | Chablani et al. |
| 2007/0022117 A1 | 1/2007 | Keohane et al. |
| 2009/0300069 A1* | 12/2009 | O'Sullivan ......... G06F 16/2379 |

OTHER PUBLICATIONS

Johnson, Bruce, Windows Azure Data Storage, Wroz Press, Feb. 2014 ISBN 9781118708811, Chapter 3: Blob Storage. (Year: 2014).*

(Continued)

*Primary Examiner* — Jason W Blust
(74) *Attorney, Agent, or Firm* — Alleman Hall Creasman & Tuttle LLP

(57) ABSTRACT

A cloud storage system includes a processor and a non-transitory computer-readable medium to store blob table management instructions for execution by the processor. The blob table management instructions are configured to manage a plurality of storage requests for a blob stored in a storage stamp as snapshots in a blob table and selectively create a user snapshot of at least one of the snapshots in the blob table. When automatic snapshots are enabled, the blob table management instructions are configured to receive a first request to overwrite the blob. If the first request does not further specify a key of the one of the snapshots in the blob table, the blob table management instructions are configured to add a new snapshot to the blob table and maintain storage of a prior snapshot of the blob for a maximum period.

20 Claims, 21 Drawing Sheets

(56) References Cited

OTHER PUBLICATIONS

Hauss, Michael, "Soft Delete for Azure Storage Blobs now in Public Preview", Retrieved From: https://azure.microsoft.com/en-in/blog/soft-delete-for-azure-storage-blobs-now-in-public-preview/, Mar. 27, 2018, 6 Pages.

Mantri, Gaurav, "Oops! I Deleted My Blobs! What Can I Do?", Retrieved From: https://gauravmantri.com/2018/02/23/oops-deleted-blobs-can/, Feb. 23, 2018, 13 Pages.

"International Search Report and Written Opinion Issued in PCT Application No. PCT/US19/029524", dated Jul. 9, 2019, 13 Pages.

Wood, Mike, "An Introduction to Windows Azure BLOB Storage", Retrieved From: https://www.red-gate.com/simple-talk/cloud/cloud-data/an-introduction-to-windows-azure-blob-storage/, Jul. 12, 2013, 34 Pages.

Brad Calder et al.; "Window Azure Storage: A Highly Available Cloud Storage Service With Strong Consistency"; SOSP '11 Proceedings of the Twenty-Third ACM Symposium on Operating Systems Principles, 2011; pp. 143-157.

"Azure Storage Documentation"; https://docs.microsoft.com/en-us/asure/storage/storage-introduction; downloaded from website Oct. 18, 2018; 28 pages.

AWS Documentation; Amazon Simple Storage Service (S3); Developer Guide; Protecting Data in Amazon S3; Using Versions; Developer Guide (API Version Mar. 1, 2006); http://docs.aws.amazon.com/AmazonS3/latest/dev/Versioning.html; 5 pages.

Georgi Chalakov; "Hierarchical Namespace Service"; Microsoft 2017; 44 pages.

* cited by examiner

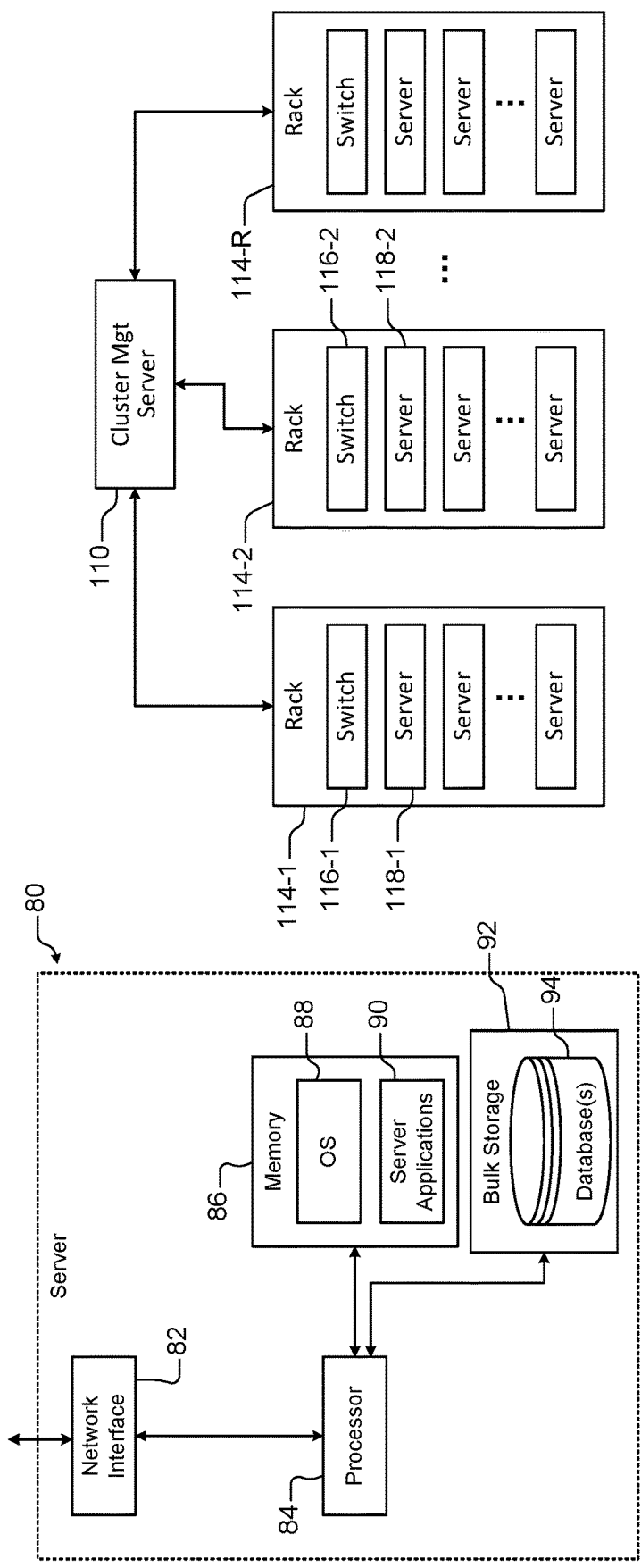

FIG. 3A

| Account Name | Container Name | Name | Creation Time | Snapshot Metadata | SSTimestamp | SSNumber | Flags |
|---|---|---|---|---|---|---|---|
| DFT | Container | blob_0000000001 | 2017/04/18 06:52:19 | | 9999/12/31 23:59:59 | 0 | 0 |

200 ← table
202 → row

FIG. 3B

| Account Name | Container Name | Name | Creation Time | Snapshot Metadata | SSTimestamp | SSNumber | Flags |
|---|---|---|---|---|---|---|---|
| DFT | Container | blob_00000000 01 | 2017/04/18 06:52:19 | SnapshotOperation:PutBlob<br>SoftDeleteExpiryTime: 9999/12/31 23:59:59<br>SoftDeleteTime: 9999/12/31 23:59:59 | 2017/04/18 06:52:19 | 0 | AS |
| DFT | Container | blob_00000000 01 | 2017/04/18 06:53:27 | SnapshotCreationTime: 2017/04/18 06:53:27 | 9999/12/31 23:59:59 | 1 | 0 |

200, 202, 204, 206, 208

| AccountName | ContainerName | Name | Creation Time | Snapshot Metadata | SSTimestamp | SSNumber | Flags |
|---|---|---|---|---|---|---|---|
| DFT | Container | blob_0000000001 | 2017/04/18 06:52:19 | SnapshotOperation:PutBlob SoftDeleteExpiryTime: 9999/12/31 23:59:59 SoftDeleteTime: 9999/12/31 23:59:59 | 2017/04/18 06:52:19 | 0 | AS |
| DFT | Container | blob_0000000001 | 2017/04/18 06:53:27 | SnapshotOperation:PutBlob SnapshotCreationTime: 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 06:53:27 | | 9999/12/31 23:59:59 | 3 | 1(Invisible) |

| AccountName | ContainerName | Name | Creation Time | Snapshot Metadata | SSTimestamp | SSNumber | Flags |
|---|---|---|---|---|---|---|---|
| DFT | Container | blob_0000000001 | 2017/04/18 06:52:19 | SnapshotOperation:PutBlob<br><br>SoftDeleteExpiryTime: 9999/12/31 23:59:59<br>SoftDeleteTime: 9999/12/31 23:59:59 | 2017/04/18 06:52:19 | 0 | AS |
| DFT | Container | blob_0000000001 | 2017/04/18 06:53:27 | SnapshotOperation:PutBlob<br>SnapshotCreationTime: 2017/04/18 06:53:27<br>SoftDeleteExpiryTime: 9999/12/31 23:59:59<br>SoftDeleteTime: 9999/12/31 23:59:59 | 2017/04/18 06:53:27 | 1 | AS |
| DFT | Container | blob_0000000001 | 2017/04/18 06:53:27 | SnapshotOperation:Delete<br>SoftDeleteExpiryTime: 9999/12/31 23:59:59<br>SoftDeleteTime: 9999/12/31 23:59:59 | 2017/04/18 06:53:43 | 2 | AS |
| DFT | Container | blob_0000000001 | 1601/01/01 00:00:00 | | 9999/12/31 23:59:59 | 3 | 0 |

FIG. 3D

| AccountName | ContainerName | Name | Creation Time | Snapshot Metadata | SSTimestamp | SSNumber | Flags |
|---|---|---|---|---|---|---|---|
| DFT | Container | blob_0000000001 | 2017/04/18 06:52:19 | SnapshotOperation:PutBlob SoftDeleteExpiryTime: 9999/12/31 23:59:59 SoftDeleteTime: 9999/12/31 23:59:59 | 2017/04/18 06:52:19 | 0 | AS |
| DFT | Container | blob_0000000001 | 2017/04/18 06:53:27 | SnapshotOperation:PutBlob SnapshotCreationTime : 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 1601/01/01 00:00:00 | | 9999/12/31 23:59:59 | 3 | 0 |

FIG. 3E

| Account Name | Container Name | Name | Creation Time | Snapshot Metadata | SSTimestamp | SSNumber | Flags |
|---|---|---|---|---|---|---|---|
| DFT | Container | blob_00000000 01 | 2017/04/18 06:52:19 | SnapshotOperation:PutBl ob SoftDeleteExpiryTime: 9999/12/31 23:59:59 SoftDeleteTime: 9999/12/31 23:59:59 | 2017/04/18 06:52:19 | 0 | AS |
| DFT | Container | blob_00000000 01 | 2017/04/18 06:53:27 | SnapshotOperation:PutBl ock SnapshotCreationTime :2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_00000000 01 | 2017/04/18 06:53:27 | SnapshotOperation:Delet e SoftDeleteExpiryTime: 9999/12/31 23:59:59 SoftDeleteTime: 9999/12/31 23:59:59 | 2017/04/18 06:53:43 | 2 | AS |
| DFT | Container | blob_00000000 01 | 2017/04/18 07:01:22 | | 9999/12/31 23:59:59 | 3 | 0 |

FIG. 3F

| AccountName | ContainerName | Name | Creation Time | Snapshot Metadata | SSTimestamp | SSNumber | Flags |
|---|---|---|---|---|---|---|---|
| DFT | Container | blob_0000000001 | 2017/04/18 06:52:19 | SnapshotOperation:PutBlob SoftDeleteExpiryTime: 9999/12/31 23:59:59 SoftDeleteTime: 9999/12/31 23:59:59 | 2017/04/18 06:52:19 | 0 | AS |
| DFT | Container | blob_0000000001 | 2017/04/18 06:53:27 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 07:01:22 | SnapshotOperation:PutBlockList SoftDeleteExpiryTime: 9999/12/31 23:59:59 SoftDeleteTime: 9999/12/31 23:59:59 | 2017/04/18 07:01:22 | 3 | AS |
| DFT | Container | blob_0000000001 | 2017/04/18 07:05:12 | SnapshotCreationTime 2017/04/18 07:05:12 | 9999/12/31 23:59:59 | 4 | 0 |

FIG. 3G

| AccountName | ContainerName | Name | Creation Time | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 9999/12/31 23:59:59 | SnapshotOperation:PutBlob<br>SoftDeleteExpiryTime: 2017/04/25 07:52:19 ←236<br>SoftDeleteTime: 2017/04/18 07:52:19 | 2017/04/18 06:52:19 | 0 | SD |
| DFT | Container | blob_0000000001 | 2017/04/18 06:53:27 | 9999/12/31 23:59:59 | SnapshotOperation:PutBlock<br>SnapshotCreationTime: 2017/04/18 06:53:27<br>SoftDeleteExpiryTime: 9999/12/31 23:59:59<br>SoftDeleteTime: 9999/12/31 23:59:59 | 2017/04/18 06:53:27 | 1 | AS |
| DFT | Container | blob_0000000001 | 2017/04/18 06:53:27 | 9999/12/31 23:59:59 | SnapshotOperation:Delete<br>SoftDeleteExpiryTime: 9999/12/31 23:59:59<br>SoftDeleteTime: 9999/12/31 23:59:59 | 2017/04/18 06:53:43 | 2 | AS |
| DFT | Container | blob_0000000001 | 2017/04/18 07:01:22 | 9999/12/31 23:59:59 | SnapshotOperation:PutBlockList<br>SoftDeleteExpiryTime: 9999/12/31 23:59:59<br>SoftDeleteTime: 9999/12/31 23:59:59 | 2017/04/18 07:01:22 | 3 | AS |
| DFT | Container | blob_0000000001 | 2017/04/18 07:05:12 | 9999/12/31 23:59:59 | SnapshotCreationTime: 2017/04/18 07:05:12 | 9999/12/31 23:59:59 | 4 | 0 |

FIG. 3H

| Account Name | Container Name | Name | Creation Time 238 | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 2017/04/04 07:52:20 | SnapshotOperation:PutBlob | 2017/04/18 06:52:19 | 0 | AS |
| DFT | Container | blob_0000000001 | 2017/04/18 06:53:27 | 9999/12/31 23:59:59 | SnapshotOperation:PutBlock SnapshotCreationTime: 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 07:01:22 | 9999/12/31 23:59:59 | SnapshotOperation:PutBlockList SoftDeleteExpiryTime: 9999/12/31 23:59:59 SoftDeleteTime: 9999/12/31 23:59:59 | 2017/04/18 07:01:22 | 3 | AS |
| DFT | Container | blob_0000000001 | 2017/04/18 07:05:12 | 9999/12/31 23:59:59 | SnapshotCreationTime: 2017/04/18 07:05:12 | 9999/12/31 23:59:59 | 4 | 0 |

FIG. 3I

| Account Name | ContainerName | Name | Creation Time | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 2017/04/04 07:52:19 | SnapshotOperation:PutBlob | 2017/04/18 06:52:19 | 0 | AS |
| DFT | Container | blob_0000000001 | 2017/04/18 06:53:27 | 9999/12/31 23:59:59 | SnapshotOperation:PutBlock SnapshotCreationTime: 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 07:01:22 | 9999/12/31 23:59:59 | SnapshotOperation:PutBlockList SoftDeleteExpiryTime: 9999/12/31 23:59:59 SoftDeleteTime: 9999/12/31 23:59:59 | 2017/04/18 07:01:22 | 3 | AS |
| DFT | Container | blob_0000000001 | 2017/04/18 07:05:12 | 9999/12/31 23:59:59 | SnapshotCreationTime: 2017/04/18 07:05:12 | 2017/04/18 07:05:12 | 4 | 0 |
| DFT | Container | blob_0000000001 | 2017/04/18 07:05:12 | 9999/12/31 23:59:59 | SnapshotCreationTime: 2017/04/18 06:52:20 | 9999/12/31 23:59:59 | 5 | 0 |

FIG. 3J

| AccountName | ContainerName | Name | Creation Time | Expiration Time | Snapshot Metadata | SSTimestamp | SSNumber | Flags |
|---|---|---|---|---|---|---|---|---|
| DFT | Container | blob_000000 0001 | 2017/04/18 06:52:19 | 2017/04/04 07:52:19 | SnapshotOperation:PutBlob | 2017/04/ 18 06:52:19 | 0 | AS |
| DFT | Container | blob_000000 0001 | 2017/04/18 06:53:27 | 9999/12/31 23:59:59 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 | 2017/04/ 18 06:53:27 | 1 | AS |
| DFT | Container | blob_000000 0001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/ 18 06:53:43 | 2 | AS |
| DFT | Container | blob_000000 0001 | 2017/04/18 07:01:22 | 9999/12/31 23:59:59 | SnapshotOperation:PutBlock List SoftDeleteExpiryTime: 9999/12/31 23:59:59 SoftDeleteTime: 9999/12/31 23:59:59 | 2017/04/ 18 07:01:22 | 3 | AS |
| DFT | Container | blob_000000 0001 | 2017/04/18 07:05:12 | 9999/12/31 23:59:59 | SnapshotCreationTime 2017/04/18 07:05:12 | 2017/04/ 18 07:05:12 | 4 | 0 |
| DFT | Container | blob_000000 0001 | 2017/04/18 07:05:12 | 9999/12/31 23:59:59 | SnapshotOperation:Promote Snapshot SnapshotCreationTime 2017/04/18 08:52:20 | 2017/04/ 18 08:52:20 | 5 | AS |
| DFT | Container | blob_000000 0001 | 2017/04/18 09:11:12 | 9999/12/31 23:59:59 | SnapshotCreationTime 2017/04/18 09:11:12 | 9999/12/ 31 23:59:59 | 6 | 0 |

FIG. 3K

| AccountName | ContainerName | Name | Creation Time | Expiration Time | Snapshot Metadata | SSTimestamp | SSNumber | Flags |
|---|---|---|---|---|---|---|---|---|
| DFT | Container | blob_000000 0001 | 2017/04/18 06:52:19 | 2017/04/04 07:52:19 | SnapshotOperation:PutBlob | 2017/04/18 06:52:19 | 0 | AS |
| DFT | Container | blob_000000 0001 | 2017/04/18 06:53:27 | 9999/12/31 23:59:59 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_000000 0001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_000000 0001 | 2017/04/18 07:01:22 | 9999/12/31 23:59:59 | SnapshotOperation:PutBlock List SoftDeleteExpiryTime: 9999/12/31 23:59:59 SoftDeleteTime: 9999/12/31 23:59:59 | 2017/04/18 07:01:22 | 3 | AS |
| DFT | Container | blob_000000 0001 | 2017/04/18 07:05:12 | 9999/12/31 23:59:59 | SnapshotCreationTime 2017/04/18 07:05:12 | 2017/04/18 07:05:12 | 4 | 0 |
| DFT | Container | blob_000000 0001 | 2017/04/18 07:05:12 | 9999/12/31 23:59:59 | SnapshotOperation:Promote Snapshot SnapshotCreationTime 2017/04/18 08:52:20 | 2017/04/18 08:52:20 | 5 | AS |
| DFT | Container | blob_000000 0001 | 2017/04/18 09:11:12 | 9999/12/31 23:59:59 | SnapshotCreationTime 2017/04/18 09:11:12 | 9999/12/31 23:59:59 | 5 | 1(invisible) |

FIG. 3L

| AccountName | ContainerName | Name | Creation Time | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 2017/04/04 07:52:19 | SnapshotOperation:PutBlob | 2017/04/18 06:52:19 | 0 | AS |
| DFT | Container | blob_0000000001 | 2017/04/18 06:53:27 | 9999/12/31 23:59:59 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 07:01:22 | 9999/12/31 23:59:59 | SnapshotOperation:PutBlock List SoftDeleteExpiryTime: 9999/12/31 23:59:59 SoftDeleteTime: 9999/12/31 23:59:59 | 2017/04/18 07:01:22 | 3 | AS |
| DFT | Container | blob_0000000001 | 2017/04/18 07:05:12 | 9999/12/31 23:59:59 | SnapshotRowCreationTime: 2017/04/18 07:05:12 | 2017/04/18 07:05:12 | 4 | 0 |
| DFT | Container | blob_0000000001 | 2017/04/18 07:05:12 | 9999/12/31 23:59:59 | SnapshotOperation:Promote Snapshot SnapshotCreationTime 2017/04/18 08:52:20 | 2017/04/18 08:52:20 | 5 | AS |
| DFT | Container | blob_0000000001 | 2017/04/18 09:12:26 | 9999/12/31 23:59:59 | | 9999/12/31 23:59:59 | 6 | 0 |

FIG. 3M

| AccountName | ContainerName | Name | Creation Time | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 2017/04/04 07:52:19 | SnapshotOperation:PutBlob | 2017/04/18 06:52:19 | 0 | AS |
| DFT | Container | blob_0000000001 | 2017/04/18 06:53:27 | 9999/12/31 23:59:59 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 06:53:27 | 9999/12/31 23:59:59 | SnapshotOperation:Delete SoftDeleteExpiryTime: 9999/12/31 23:59:59 SoftDeleteTime: 9999/12/31 23:59:59 | 2017/04/18 06:53:43 | 2 | AS |
| DFT | Container | blob_0000000001 | 2017/04/18 07:01:22 | 9999/12/31 23:59:59 | SnapshotOperation:PutBlockList SoftDeleteExpiryTime: 9999/12/31 23:59:59 SoftDeleteTime: 9999/12/31 23:59:59 | 2017/04/18 07:01:22 | 3 | SD |
| DFT | Container | blob_0000000001 | 2017/04/18 07:05:12 | 9999/12/31 23:59:59 | SnapshotCreationTime 2017/04/18 07:05:12 | 2017/04/18 07:05:12 | 4 | 0 |
| DFT | Container | blob_0000000001 | 2017/04/18 07:05:12 | 9999/12/31 23:59:59 | SnapshotOperation:PromoteSnapshot SnapshotCreationTime 2017/04/18 08:52:20 | 2017/04/18 08:52:20 | 5 | AS |
| DFT | Container | blob_0000000001 | 2017/04/18 09:12:26 | 9999/12/31 23:59:59 | | 9999/12/31 23:59:59 | 6 | 0 |

| AccountName | Container Name | Name | Creation Time | Expiration Time | Snapshot Metadata | SSTimestamp | SSNumber | Flags |
|---|---|---|---|---|---|---|---|---|
| DFT | Container | blob_0000000001 | 2017/04/18 06:52:19 | 2017/04/04 07:52:19 | SnapshotOperation:PutBlob | 2017/04/18 06:52:19 | 0 | AS |
| DFT | Container | blob_0000000001 | 2017/04/18 06:53:27 | 9999/12/31 23:59:59 | SnapshotOperation:PutBlock SnapshotCreationTime: 2017/04/18 06:53:27 SoftDeleteExpiryTime: 9999/12/31 23:59:59 SoftDeleteTime: 9999/12/31 23:59:59 | 2017/04/18 06:53:27 | 1 | AS |
| DFT | Container | blob_0000000001 | 2017/04/18 07:01:22 | 9999/12/31 23:59:59 | SnapshotOperation:PutBlockList SoftDeleteExpiryTime: 9999/12/31 23:59:59 SoftDeleteTime: 9999/12/31 23:59:59 | 2017/04/18 07:01:22 | 2 | AS |
| DFT | Container | blob_0000000001 | 2017/04/18 07:05:12 | 9999/12/31 23:59:59 | SnapshotCreationTime: 2017/04/18 07:05:12 | 2017/04/18 07:05:12 | 3 | AS |
| DFT | Container | blob_0000000001 | 2017/04/18 07:05:12 | 9999/12/31 23:59:59 | SnapshotOperation:PromoteSnapshot SnapshotCreationTime: 2017/04/18 08:52:20 | 2017/04/18 08:52:20 | 4 | 0 |
| DFT | Container | blob_0000000001 | 2017/04/19 10:52:19 | 9999/12/31 23:59:59 | | 9999/12/31 23:59:59 | 5 | 0 |

FIG. 3O

| AccountName | ContainerName | Name | Creation Time | Expiration Time | Snapshot Metadata | SSTimestamp | SSNumber | Flags |
|---|---|---|---|---|---|---|---|---|
| DFT | Container | blob_0000000 001 | 2017/04/18 06:52:19 | 2017/04/04 07:52:19 | SnapshotOperation:PutBlob | 2017/04/1 8 06:52:19 | 0 | 2097152 |
| DFT | Container | blob_0000000 001 | 2017/04/18 06:53:27 | 9999/12/31 23:59:59 | SnapshotOperation:PutBlock SnapshotCreationTime 2017/04/18 06:53:27 SoftDeleteExpiryTime: 9999/12/31 23:59:59 SoftDeleteTime: 9999/12/31 23:59:59 BlobSoftDeleteTime: 2017/04/18 06:53:43 | 2017/04/1 8 06:53:27 | 1 | 2097152 |
| DFT | Container | blob_0000000 001 | 2017/04/18 07:01:22 | 9999/12/31 23:59:59 | SnapshotOperation:PutBlockLi st SoftDeleteExpiryTime: 9999/12/31 23:59:59 SoftDeleteTime: 9999/12/31 23:59:59 | 2017/04/1 8 07:01:22 | 2 | 2097152 |
| DFT | Container | blob_0000000 001 | 2017/04/18 07:05:12 | 9999/12/31 23:59:59 | SnapshotCreationTime 2017/04/18 07:05:12 | 2017/04/1 8 07:05:12 | 3 | 2097152 |
| DFT | Container | blob_0000000 001 | 2017/04/18 07:05:12 | 9999/12/31 23:59:59 | SnapshotOperation:PromoteSn apshot SnapshotCreationTime 2017/04/18 08:52:20 | 2017/04/1 8 08:52:20 | 4 | 0 |
| DFT | Container | blob_0000000 001 | 2017/04/19 10:52:19 | 9999/12/31 23:59:59 | | 2017/04/1 8 18:52:20 | 5 | 0 |
| DFT | Container | blob_0000000 001 | 2017/04/19 10:52:19 | 9999/12/31 23:59:59 | | 9999/12/3 1 23:59:59 | 6 | 0 |

FIG. 3P

| Request | ACC | Container | Blob | Snap TS | SS# | Flag | CBL | DeltaSize | Size | TotDelta | TotSize |
|---|---|---|---|---|---|---|---|---|---|---|---|
| T0:<br>Put Block B1<br>Put Block B2<br>Put Blocklist (B1,B2) | Med1 | Cont1 | File.txt | MAX | 0 | | B1, B2 | 2 | 2 | 2 | 2 |
| T1:<br>Put Block B3<br>Put Blocklist (B3,B2) | Med1<br>Med1 | Cont1<br>Cont1 | File.txt<br>File.txt | T1<br>MAX | 0<br>1 | AS | B1, B2<br>B3, B2 | 2<br>1 | 2<br>2 | 3 | 4 |
| T2:<br>Delete T1<br>T1 Snapshot | Med1<br>Med1 | Cont1<br>Cont1 | File.txt<br>File.txt | T1<br>MAX | 0<br>1 | AS; SD | B1, B2<br>B3, B2 | 2<br>1 | 2<br>2 | 3 | 4 |
| T3:<br>Put Block B4<br>Put Blocklist (B4,B2,B1) | Med1<br>Med1<br>Med1 | Cont1<br>Cont1<br>Cont1 | File.txt<br>File.txt<br>File.txt | T1<br>T3<br>MAX | 0<br>1<br>1 | AS; SD<br>AS | B1, B2<br>B3, B2<br>B4, B2, B3 | 2<br>1<br>1 | 2<br>2<br>3 | 4 | 7 |

*FIG. 4B*

DISTRIBUTED DATA STORAGE SYSTEM WITH AUTOMATIC SNAPSHOTS, USER SNAPSHOTS AND SOFT DELETE

CROSS-REFERENCE TO RELATED APPLICATIONS

This application claims the benefit of U.S. Provisional Application No. 62/667,864, filed May 7, 2018. The entire disclosures of the applications referenced above are incorporated herein by reference.

FIELD

The present disclosure relates to distributed data storage systems, and more particularly to distributed data storage systems with automatic snapshots, user snapshots and soft delete.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed data storage and computing systems are often used by enterprises to add computing and storage capacity as needed without requiring the enterprise to build out the infrastructure in advance. For example, cloud service providers rent data storage and computing resources (such as physical machines, virtual machines and containers) to tenants. Examples of data that is stored include unstructured user files or blobs, tables (structured storage) and queues (message delivery). To provide the cloud services, cloud service providers typically employ one or more data centers that include clusters of server racks. Each of the server racks generally includes a switch, a plurality of servers, and/or data storage devices.

Tenants use the computing resources and data storage in a variety of different ways. Some tenants simply use the data storage provided by the cloud network. Other tenants use both the computing resources and the data storage provided by the cloud network. Examples uses include web hosting, social networking, and/or enterprise support.

SUMMARY

A cloud storage system includes a processor and a non-transitory computer-readable medium to store blob table management instructions for execution by the processor. The blob table management instructions are configured to manage a plurality of storage requests for a blob stored in a storage stamp as snapshots in a blob table and selectively create a user snapshot of at least one of the snapshots in the blob table. When automatic snapshots are enabled, the blob table management instructions are configured to receive a first request to overwrite the blob. If the first request does not further specify a key of the one of the snapshots in the blob table, the blob table management instructions are configured to add a new snapshot to the blob table and maintain storage of a prior snapshot of the blob for a maximum period.

In other features, in response to the first request and in response to automatic snapshots being disabled, the blob table management instructions are further configured to overwrite a snapshot of the blob without creating a new snapshot.

In other features, the blob table management instructions are further configured to, when automatic snapshots are enabled, receive a second request to delete the blob stored in the blob table. If the second request does not further specify a key corresponding to one of the snapshots in the blob table, the blob table management instructions add a new snapshot to the blob table and maintain storage of the blob for a maximum period.

In other features, the blob table management instructions are further configured to add an invisible flag to a snapshot in the blob table. If the second request further specifies a key corresponding to one of the snapshots in the blob table, the blob table management instructions are further configured to change an expiration of a corresponding snapshot in the blob table to a predetermined period that is less than the maximum period.

In other features, in response to the second request and in response to automatic snapshots being disabled, the blob table management instructions are further configured to delete a snapshot in the blob table without creating a new snapshot. The blob table management instructions are further configured to promote at least one of the snapshots in the blob table in response to a promotion request.

In other features, each of the snapshots in the blob table is associated with one of a block list or an index. Each of the block lists includes one or more blocks, each of the indexes includes one or more pages. The blob table management instructions are configured to determine a delta size including at least one of a sum of unique blocks in the block lists of the snapshot associated with the blob and unique pages in the indexes. The delta size is less than or equal to a total number of blocks in the block lists and the pages in the indexes for each of the snapshots of the blob.

In other features, the blob table management instructions are further configured to transmit a total delta size for the blob to a remote server.

A storage stamp in cloud storage system includes a front end layer to receive requests to store blobs. Each of the blobs includes data. A partition layer includes a blob table manager to manage storage of the blobs using a blob table. A storage stamp stores the blobs. The blob table manager executes instructions configured to manage snapshot of the blobs in the blob table in response to requests to store blobs in the blob table, create snapshot of the blobs in the blob table, promote at least one of the snapshots in the blob table, overwrite snapshots of the blobs in the blob table, and enable hard delete and soft delete of at least one snapshot of the blobs in the blob table.

In other features, when automatic snapshots are enabled, the instructions are configured to receive a first request to overwrite one of the blobs in the blob table. If the first request does not further specify a key of the one of the snapshots of one of the blobs, the instructions are configured to add a new snapshot to the blob table for the one of the blobs and maintain storage of a prior snapshot of the one of the blobs for a maximum period.

In other features, in response to the first request and in response to the automatic snapshot being disabled, the instructions are further configured to overwrite the one of the blobs without creating a new snapshot. The instructions are further configured to, when automatic snapshots are enabled, receive a second request to delete one of the blobs stored in the blob table. If the second request does not further specify a key of one of the snapshots of one of the blobs, the instructions are configured to add a new snapshot to the blob table and maintain storage of the blob for a maximum period.

In other features, the instructions are further configured to add an invisible flag to a snapshot of one of the blobs in the blob table. If the second request further specifies a key corresponding to one of the snapshots for one of the blobs in the blob table, the instructions are further configured to change an expiration of a corresponding snapshot of the one of the blobs in the blob table for a predetermined period that is less than the maximum period.

In other features, in response to the second request and in response to the automatic snapshot being disabled, the instructions are further configured to delete a snapshot of one of the blobs without creating a new snapshot.

In other features, each of the snapshots in the blob table is associated with one of a block list or an index. Each of the block lists includes one or more blocks, each of the indexes includes one or more pages. The blob table management instructions are configured to determine a delta size including at least one of a sum of unique blocks in the block lists of the snapshot associated with the blob and unique pages in the indexes. The delta size is less than or equal to a total number of blocks in the block lists and the pages in the indexes for each of the snapshots of the blob.

A storage stamp in cloud storage system includes a front end layer to receive requests for blobs. Each of the blobs includes data. A partition layer includes a blob table manager to manage storage of the blobs using a blob table. A storage stamp stores the blobs. The blob table manager executes instructions configured to store snapshot in the blob table for each of the blobs in response to storage requests corresponding to the blobs. Each of the snapshots in the blob table is associated with one of a block list or an index. Each of the block lists includes one or more blocks. Each of the indexes includes one or more pages. The blob table manager is configured to determine a delta size including at least one of a sum of unique blocks in the block lists of the snapshot associated with the blob and unique pages in the indexes. The delta size is less than or equal to a total number of blocks in the block lists and the pages in the indexes for each of the snapshots of the blob.

In other features, the instructions are further configured to transmit the delta size for the blob to a remote server. The instructions are further configured to determine a total delta size for the blobs and transmit the total delta size to a remote server.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 1C and 1D are functional block diagrams of a server including a blob table manager and a blob table according to the present disclosure;

FIG. 1E is a functional block diagram of a cluster of server racks according to the present disclosure;

FIGS. 3A-3P are examples of blob tables for a blob that illustrate a use case for managing the blob table to allow automatic snapshots, user snapshots and soft delete according to the present disclosure;

FIG. 4B is an example of a blob table including delta_size according to the present disclosure.

In the drawings, reference numbers may be reused to identify similar and/or identical elements.

DETAILED DESCRIPTION

Figure 1A:
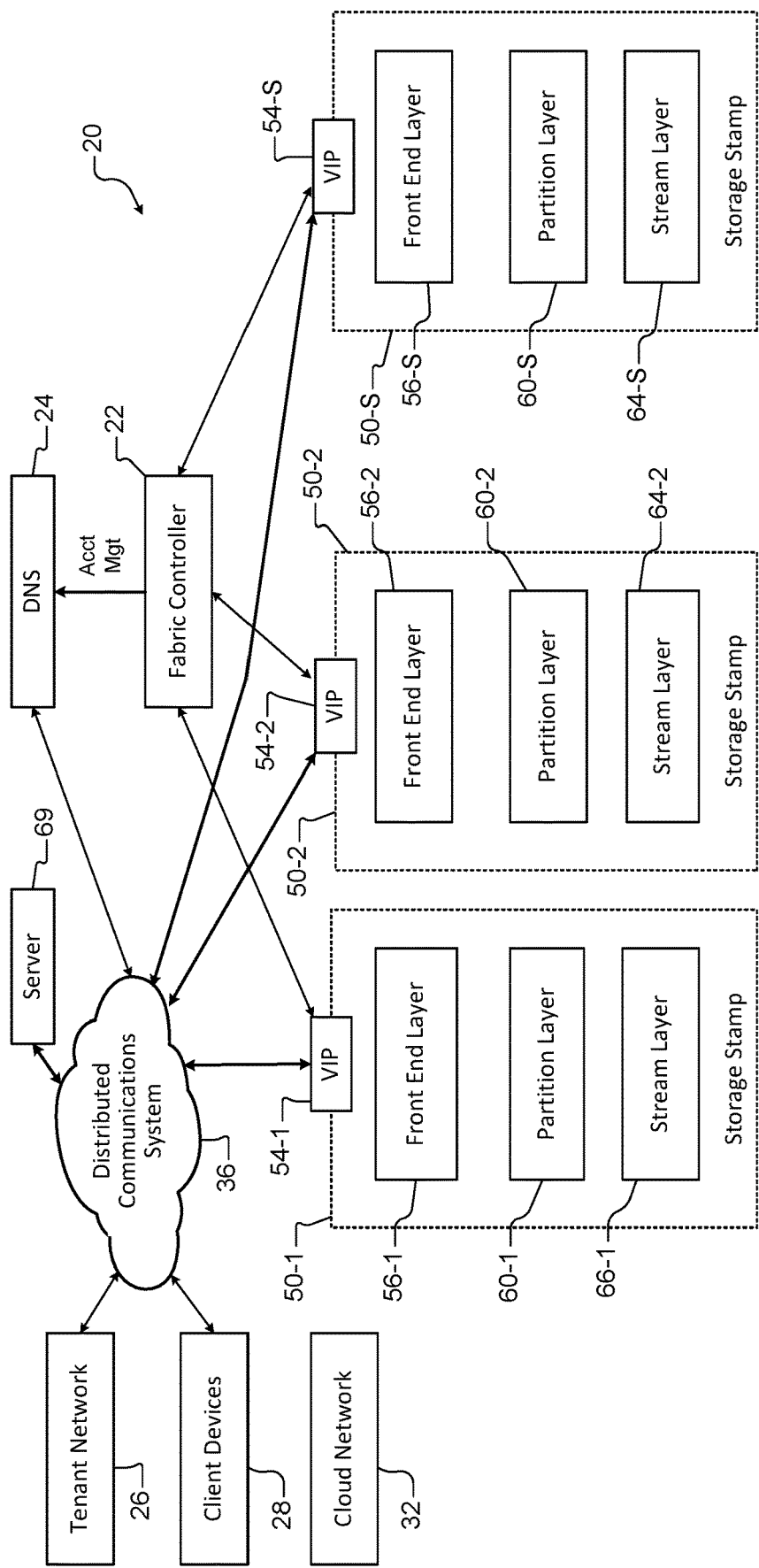
FIG. 1A is a functional block diagram of an example of a distributed data storage system according to the present disclosure.

Distributed data storage systems and methods according to the present disclosure provide improved data storage management for blobs. Tenants or tenant applications often have bugs or other issues that cause blob data to be inadvertently overwritten or deleted. Distributed data storage systems and methods according to the present disclosure enable blob-level changes such as overwrites and deletes to be protected using soft delete when this situation occurs. As used herein, soft delete refers to automatically saving a copy or snapshot (SS or automatic SS) for a predetermined period (less than an indefinite period or its equivalent) in response to changes such as overwrite and/or delete. Distributed data storage systems and methods according to the present disclosure also empower customers to execute recovery actions when this situation occurs, which reduces business losses and overall operating costs. More particularly, the distributed data storage systems and methods according to the present disclosure provide enhanced support for automatic SS, user SS and soft delete functionality in response to blob changes.

In some examples, when some changes are made such as deleting or overwriting a blob, instead of permanently deleting the blob, the corresponding SS of the blob is stored as a SS and preserved until the tenant explicitly deletes the SS. While the foregoing disclosure will be described in the context of changes including deleting or overwriting a blob, the same techniques can be made for other changes such as setting metadata or properties. In some examples, the tenant can enable or suspend the automatic SS feature at an account level. The existing SS (created while the automatic SS is enabled) are preserved and accessible when automatic SS is disabled.

When deleting a specific SS of a blob, the SS of the blob becomes invisible to the tenant and will be kept for a predetermined period rather than permanently deleting the blob. In other words, instead of permanently deleting the SS of the blob, the SS becomes invisible to the tenant and will be kept for a predetermined period (less than maximum time). In some examples, the invisible SS can be recovered using an undelete command.

In some examples, all of the different SS of the blob are stored independently. In some examples, some of the SS of the blob are associated with a block list including one or more blocks and/or an index including one or more pages having a fixed or variable size. Some of the blocks/pages may be shared by two or more of the block lists or indexes. A blob size is calculated that includes each of the blocks in the block lists for each SS of the blob or each of the pages in the index for each SS that is stored.

In some examples, the different blobs have non-overwrite data modifications (such as PutBlock, PutPage, Append-Block). In some examples, automatic SS are not generated for these requests. In other examples, SS may be created during overwrite or commit scenarios (such as copying a blob on top of another blob, or putting a blob on top of another blob, or committing a new block list can create a SS).

According to the present disclosure, a delta blob size or delta_size is calculated for each blob to determine a total number of unique blocks or pages in all of the block lists or indexes associated with different SS of the blob that are stored. In other words, shared blocks or pages between different stored SS (or block lists) of the same blob are not counted in the delta_size. The delta_size is less than or equal to the blob size when all of the blobs in the block lists or pages in the index are counted.

Distributed data storage systems can be implemented in a cloud network that provides cloud services across different geographic regions using one or more data centers. The cloud network typically includes a fabric controller to provision resources, manage allocated resources, handle deployment/upgrade, and/or manage the cloud services.

The tenant typically rents computing resources in the cloud network to run tenant applications and/or stores user files or blobs using storage applications run by the cloud network. The storage applications perform storage-related services including managing data placement across the disks in the clusters, replication of the data and/or load balancing of the data across the clusters. Components of the cloud network running the tenant applications include physical machines, virtual machines or containers (implemented by nodes or servers in the server racks).

Referring now to FIG. 1, a distributed data storage system 20 such as a cloud network is shown. While an example of a cloud network is shown for purposes of illustration, other network architectures may be used. A fabric controller 22 provisions resources, manages allocated resources, handles deployment/upgrade, and/or manages the cloud services. The fabric controller 22 performs account management by setting up IP addresses for storage stamps and coordinating with one or more domain name servers (DNS) 24. Storage requests can be received from any number of different locations including a tenant network 26, client devices 28, cloud networks 32 and/or other locations via a distributed communication system 36 such as the Internet.

The fabric controller 22 configures storage stamps 50-1, 50-2, . . . 50-S (collectively storage stamps 50) (where S is an integer greater than zero) as needed. In some examples, the fabric controller 22 assigns virtual IP addresses 54-1, 54-2, . . . 54-S (collectively VIP 54) for each of the storage stamps 50. Each of the storage stamps 50-1, 50-2, . . . 50-S includes a front end layer 56-1, 56-2, . . . 56-S (collectively front end layers 56), partition layers 60-1, 60-2, . . . 60-S (collectively partition layers 60), and stream layers 64-1, 64-2, . . . 64-S (collectively stream layers 64). In some examples, one or more additional servers 69 communicate with the storage stamps 50. For example, a billing server may receive data relating to a size of the storage stamps associated with the tenants to generate billing.

In some examples, the front end layers 56-1, 56-2, . . . 56-S queries a partition map (described below) identifying partitions within the corresponding storage stamps 50. Initially, the storage stamps 50 will have one partition. As usage increases, additional partitions will be added on an as-needed basis. In some examples, the partition map includes partition name ranges and the corresponding assigned partition server.

The front end layers 56 may include one or more servers that are provisioned and configured as needed to receive incoming requests for the data storage services. The requests can be received from a tenant located remotely, tenant applications running remotely or within the cloud network, users, and/or other sources. Upon receiving a request for data storage services, the front end layers 56 authenticate and authorize the request. The front end layers 56 route the request to one of the partition servers in the partition layers 60.

The partition layers 60 and the stream layers 64 may also include one or more servers that are provisioned and configured as needed. The partition layers 60 manage higher level abstractions of user files, structured storage, and/or messaging. The partition layers 60 also provide a scalable index, transaction ordering, and strong consistency for objects. The partition layers 60 can specifically support storing object data on top of the stream layers 64. In some examples, the partition layers 60 partitions data objects within a storage stamp.

The stream layers 64 store bits on the disks and replicate the data across multiple servers to keep the data durable within the storage stamps 50. The stream layers 64 supports block lists each including one or more blocks. The stream layers 64 store and replicate the blocks. The data stored in the stream layers 64 is accessible from the partition layers 60. The stream layers 64 may provide a file system namespace and an Application Programming Interface (API) for the partition layers 60 to perform writes.

The interface between the stream layers 64 and the partition layers 60 allows a tenant to store, read, delete, rename, append to, and/or concatenate data streams. An extent includes a sequence of blocks. A stream refers to an ordered list of extents. An extent can be a sealed in that it can no longer be appended to. The storage applications read data from extents to access the blocks within the extents.

The stream layers 64 can include a stream manager (not shown) and extent nodes (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents associated therewith and where the peer replicas are for a given extent.

Additional details relating to a distributed data storage system are described in described in commonly-assigned U.S. Pat. No. 9,736,243-B2, issued Aug. 15, 2017, and entitled "Multiple Transaction Logs In A Distributed Storage System," and Calder, Brad et al., "Windows Azure Storage, A Highly Available Cloud Storage Service with Strong Consistency" SOSP '11 Proceedings of the Twenty-Third ACM Symposium on Operating Systems Principles, 2011: Pages 143-157, which both are incorporated herein by reference in their entirety.

Figure 1B:
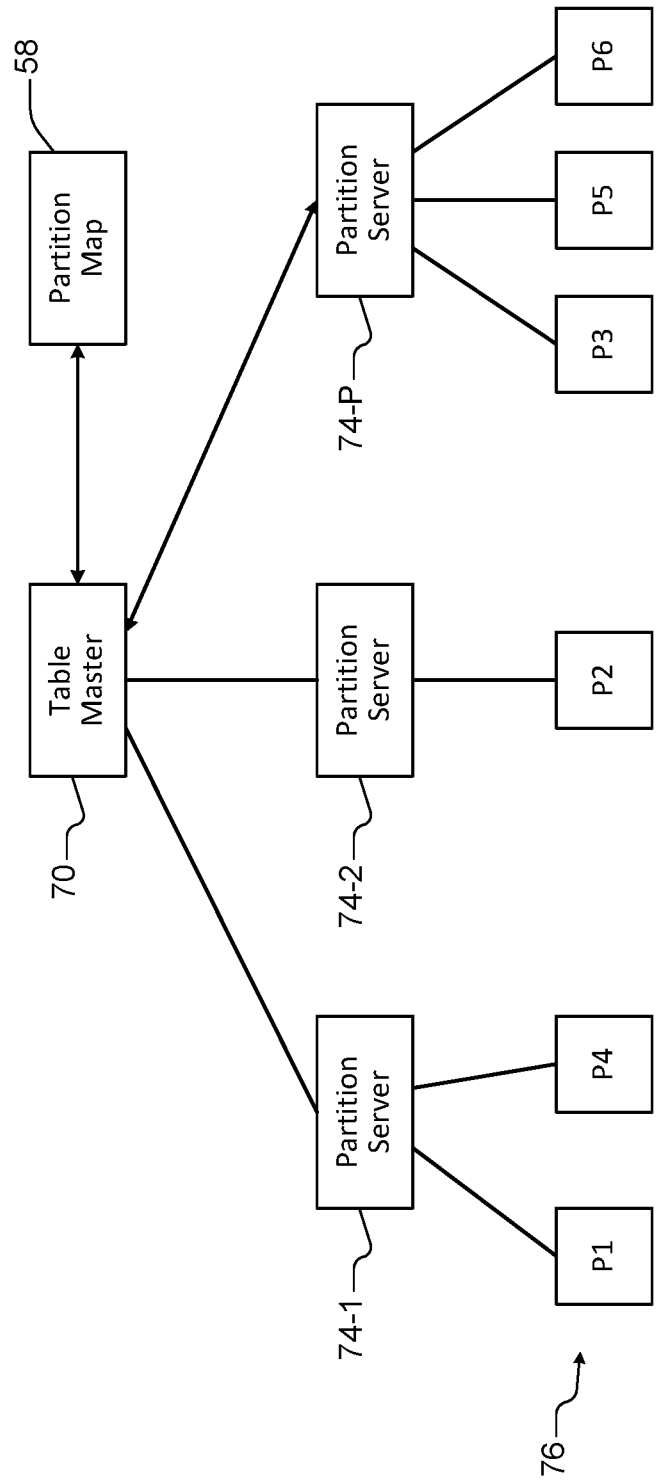
FIG. 1B is a functional block diagram illustrating an example of partitioning within a storage stamp according to the present disclosure.

Referring now to FIG. 1B, an example of partitioning of a storage stamp by the partition layer is shown. A table master 70 divides the storage system into a plurality of partitions 76 (e.g., P1, P2, . . . , and P6 in FIG. 1B) using one or more partition servers 74-1, 74-2, and 74-P (collectively partition servers 74) where P is an integer. The partition servers 74 store data and provide access to the data in the storage system. The table master 70 is configured to assign the partitions to the partition servers 74. The table master 70 is further configured to control load balancing of the partitions on the partition servers 74. Additionally, the table master 70 is configured to monitor resource utilization with respect to any of the partitions and/or the partition servers 74.

The data storage can be accessed using a key space that is divided amongst the plurality of partitions 76. In the example shown in FIG. 2, the server 74-1 is hosting partitions P1 and P4, the server 74-2 is hosting partition P1, and the server 74-P is hosting P3, P5 and P6.

Referring now to FIGS. 1C-1D, an example of a server 80 is shown. In FIG. 1C, the server 80 includes a network interface 82, one or more processors 84 and memory 86. While the server is shown as a physical machine, virtual machines and/or containers may also be used. The memory 86 includes an operating system and one or more server applications. The server 80 may further include bulk storage 92 such as one or more hard disk drives. The bulk storage 92 may store one or more tables and/or databases 94. In FIG. 1D, the server applications 90 include a blob table manager 96 that executes instructions for managing a blob table 98, which stores transactions relating to blobs as will be described further below. In some examples, the blob table 98 is stored locally at the blob table manager 96 and/or remotely in the databases 94 or another location. In some examples, the blob table manager 96 adds and removes blobs from the blob table and/or storage stamps in response to the request from the tenants. In addition to providing a record of requests, the blob table 98 also determines or reflects what is stored in the storage stamps 50.

Referring now to FIG. 1E, the front end layers 56, the partition layers 60 and the stream layers 64 are implemented using clusters of racks. A cluster management server 110 manages one or more clusters each including one or more server racks 114-1, 114-2, . . . and 114-R (collectively server racks 114) where R is an integer. Each of the server racks 114-1, 114-2, . . . and 114-R includes a switch 116-1, 116-2, . . . and 116-R (collectively switch 116), and one or more servers 118-1, 118-2, . . . and 118-R (collectively servers 118).

Figure 2:
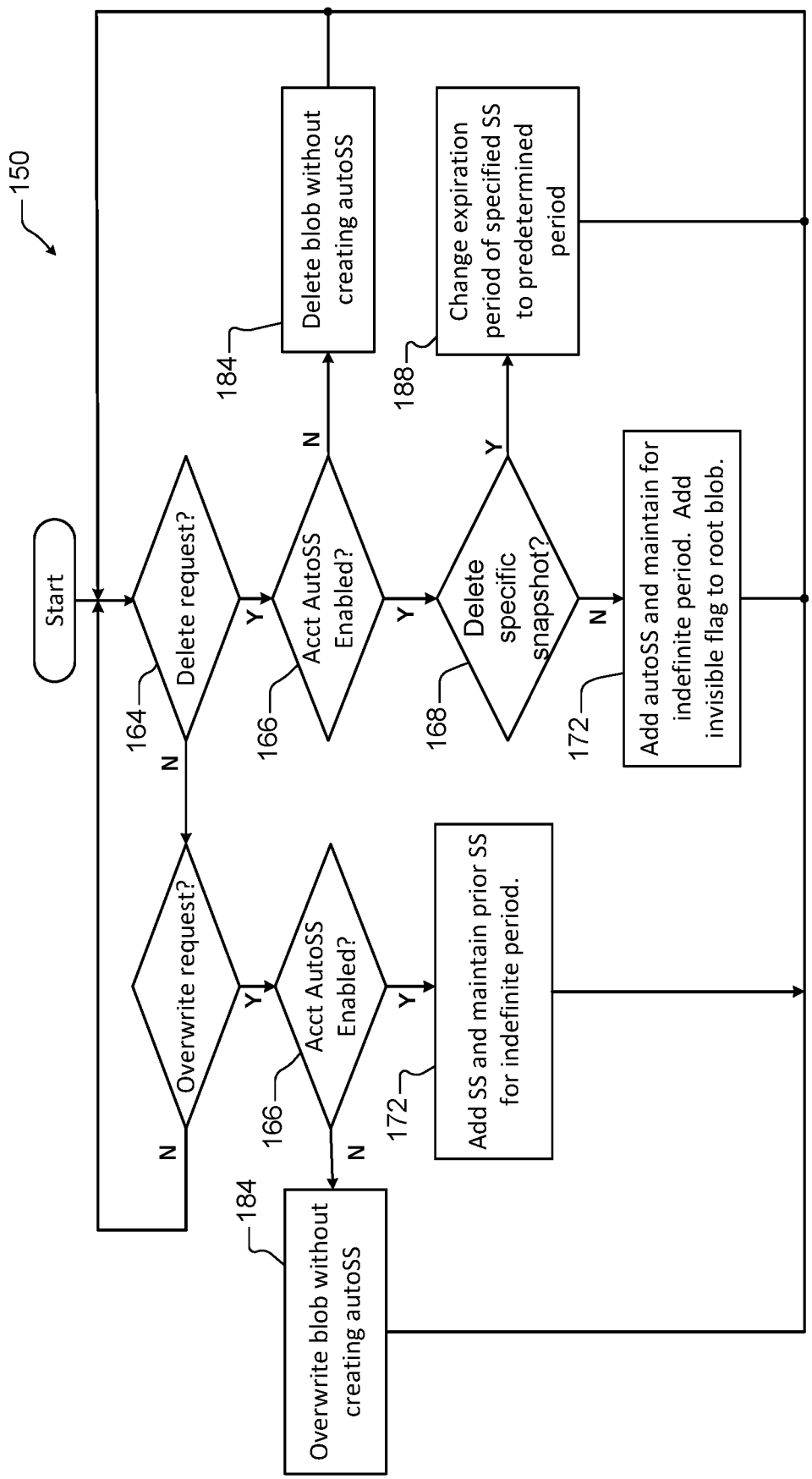
FIG. 2 is a flowchart of an example of a method for managing a blob table to allow automatic snapshots, user snapshots and soft delete according to the present disclosure.

Referring now to FIG. 2, a method 150 for managing a blob table is shown. At 164, the method determines whether a delete request has been received for a blob stored in the distributed data storage system. If 164 is true, the method determines whether account automatic SS for the tenant associated with the blob is enabled at 166. If 166 is true, the method determines whether the request identifies a specific SS at 168. In some examples, a key such as a timestamp or other unique identification (ID) may be used to identify a specific user initiated SS or automatic SS. While the foregoing description will be described assuming the timestamp is used, any other type of key may be used.

If 168 is true, the method continues at 170, adds a new SS to the blob table and maintains the prior SS in the blob table for an indefinite period. In some examples, an invisible flag is set for the root blob.

If 166 is false and account automatic SS for the tenant associated with the blob is disabled, the method continues at 172 and deletes the root blob without creating a new SS or SS. If 168 is true, the method changes the expiration period of the specified SS to a predetermined period that is less than an indefinite period. In some examples, the predetermined period can be set at the account level. For example, the predetermined period may be set to 7 days from the timestamp of the request.

If 164 is false, the method continues at 180 and determines whether the request is an overwrite (or put) request. If 180 is true, the method continues at 182 and determines whether account automatic SS for the tenant associated with the blob is enabled. If 182 is true, the method continues at 184, adds a new SS to the blob table and maintains the prior SS in the blob table for an indefinite period. If 182 is false, the method continues at 186 and overrides/replaces the root blob without creating a SS/SS.

Use Case with Automatic SS Enabled

Referring now to FIGS. 3A to 3P, a use case is presented to illustrate concepts described herein. As can be appreciated, the blob table can be maintained by the blob table manager in a variety of ways. The foregoing example is just one example thereof. Detailed steps are shown for managing a blob table 200 in response to various requests. While a REST API is used on the foregoing examples, other APIs can be used. FIGS. 3A to 3P assume that that the SS is stable but the timestamp is actually the SS creation time without the stable SS. In FIGS. 3A to 3N, automatic SS is enabled by the tenant. In FIGS. 3O to 3P described below, automatic SS is disabled.

In FIG. 3A, a request is received to put blob at a timestamp of 2017/04/18 06:52:19. The table 200 is updated with an entry 202 as shown.

In FIG. 3B, another request is received to put blob with a timestamp of 2017/04/18 06:53:27. The table 200 is updated with an entry 204 as shown in FIG. 3B. The first SS at entry 202 becomes a SS and the SS timestamp is the same as the creation time. The soft delete expiration time of the entry 202 is MAX_FILETIME (which is essentially an indefinite period) as shown at 206, which indicates that the SS cannot be auto expired. The SS can only be deleted by delete blob with a specified SS. The SS flag for the entry 202 indicates that the entry is a SS instead of a user SS or a system SS generated by soft delete/overwrite protection. The second SS at entry 204 is the current root blob and there is a SS row creation time that is same as the creation time. The SS of the entry 204 is 1.

Referring now to FIG. 3C, a request for soft delete blob (without SS) is received with a timestamp of 2017/04/18 06:53:43. The table 200 is updated by entries 214 and 216 as shown. There is a new SS generated by the blob soft delete at the entry 214, and the SS timestamp is 2017/04/18 06:53:43 (shown at 218). The soft delete expiration time is MAX_FILETIME, which indicates that the SS cannot be auto expired. It can only be deleted by delete blob with SS. The timestamp of the second SS becomes 2017/04/18 06:53:27 (shown at 270). The root blob at entry 216 has the invisible flag.

Referring now to FIG. 3D, a request to put block is received with a timestamp of 2017/04/18 06:54:33. The table 200 will be updated as shown in FIG. 3D. A new root blob row is overwriting the existing (hidden) root blob row at entry 216, but the creation time is MIN_TIME (shown at 222), indicating that the SS has not generated yet.

Referring now to FIG. 3E, a request to put block is received again with a timestamp of 2017/04/18 06:55:21. The table 200 will be updated in a temporary block list (TBL) column (not shown). Note that the table will update on the root blob row at entry 216.

Referring now to FIG. 3F, a request to put block list is received with a timestamp of 2017/04/18 07:01:22. The table 200 will be updated as shown in FIG. 3F. The creation time becomes 2017/04/18 07:01:22 (shown at 224), which is the timestamp of the put block list request.

Referring now to FIG. 3G, a request to put block list is received with a timestamp of 2017/04/18 07:05:12. The table 200 is updated at entry 228 as shown in FIG. 3G. A new root blob row at entry 228 is generated and the creation time is 2017/04/18 07:05:12 as shown at 230. The block list or CBL (not shown) of this root blob is different than the one of the previous SS.

There are various ways to read a SS of a blob. For example, when a request to read blob with the encoded timestamp of 2017/04/18 06:52:19 is received, the first SS will be returned. When a request to read blob with the encoded timestamp of 2017/04/18 06:53:27 is received, the second SS will be returned. When a request to read blob with the encoded timestamp of 2017/04/18 06:53:43 is received, the third SS will be returned. When a request to read blob with the encoded timestamp of 2017/04/18 07:01:22 is received, the fourth SS will be returned. When a request to read blob with the encoded timestamp of 2017/04/18 07:05:12 is received, the fifth SS (root blob row) will be returned.

Note that there is no data difference between the second and the third SS. The third SS is the delete marker.

Referring now to FIG. 3H, a request to soft delete a SS of the blob with the timestamp of 2017/04/18 06:52:19 is received (the delete type is soft) with a timestamp of 2017/04/18 07:52:19. The SS retention time is 7 days. The table 200 is updated as shown in FIG. 3H. The soft delete expiration time of the first SS at entry 202 is changed to be 2017/04/25 07:52:19 as shown at 236, indicating that this SS is soft deleted.

Referring now to FIG. 3I, a request to permanently delete a SS of blob with the timestamp of 2017/04/18 06:52:19 (the delete type is permanent) with a timestamp of 2017/04/18 07:52:20. The table 200 is updated as shown in FIG. 3I. The expiration time of the first SS at entry 202 is changed to 2017/04/04 07:52: 20 as shown at 238, indicating that this SS is hard deleted.

Referring now to FIG. 3J, a request to create a user SS is received with a timestamp of 2017/04/18 08:52:20 (as shown at 240). The table 200 is updated as shown in FIG. 3J. The metadata in the table shown in FIG. 3J means that user SS and the SS are all SS of the blob. The SS row of 2017/04/18 07:05:12 at entry 239 is the user SS, and the SS row of 2017/04/18 07:01:22 at entry 216 is the SS.

There are various ways to handle requests to list a blob. In response to list blob with no parameter, the root blob row with SS number is 4 is returned. In response to list blob include SS, all of the SS blob rows and the root blob will be returned.

Referring now to FIG. 3K, a request to promote a user SS with the timestamp of 2017/04/18 07:05:12 is received with a timestamp of 2017/04/18 09:11:12. The table 200 will be updated as shown in FIG. 3K. The promote SS will generate a new SS on top of the current SS at entries 239 and 242.

Referring now to FIG. 3L, a request to hard delete a root blob with timestamp 2017/04/18 09:11:12 is received. The data in the table 200 at 243 means that when the latest SS is hard deleted, the root blob row will be invisible. If the root blob has been released, the hard delete should fail.

Referring now to FIG. 3M, a request to put blob is received again on 2017/04/18 09:12:26. The table 200 is updated as shown in FIG. 3M. Put blob generates a new SS. If the put block happens after the hard delete, put block will also generate a new SS. Page blob and append blob work similarly only that Put Page and Append Block do not generate new SS.

Referring now to FIG. 3N, a request to change the blob tier to 2017/04/18 07:01:22. The table 200 is updated as shown in FIG. 3N. The metadata of the above table means that change the tier will change the blob flags and/or transition to other storage media on the SS row or the root blob.

Use Case with Automatic SS Disabled

Referring now to FIGS. 3O to 3P, automatic SS is disabled. Automatic SS are created in some situations. In FIG. 3O, a request to put blob is received with a timestamp of 2017/04/19 10:52:19. The updated table is shown in FIG. 3O. The put blob block list will overwrite the existing root blob row when the automatic SS is disabled as shown at entry 239. All of the previous SS are treated as user SS. In some examples, the billing still charges as the full copy of data. If the soft deleted flag is set, it will be invisible to customer, unless the soft deleted feature is on and "include deleted" is requested.

In FIG. 3P, a request to create a user SS is received with a timestamp of 2017/04/18 18:52:20. The table 200 is updated to include entry 250 as shown in FIG. 3P.

Various examples of requests to read SS are provided below. When a read SS with SS timestamp of 2017/04/18 06:52:19 is received, a SS row with SS number 0 is returned. When a read SS with SS timestamp of 2017/04/18 06:53:27 is received, a SS row with SS number 1 is returned. When a read SS with a timestamp of 2017/04/18 07:01:22 is received, a SS row with SS number 2 is returned. When a read SS with SS timestamp of 2017/04/18 07:05:12 is received, a SS row with SS number 3 is returned. When a read SS with a SS timestamp of 2017/04/18 08:52:20 is received, a SS row with SS number 4 is returned. When a read SS with a SS timestamp of 2017/04/18 18:52:20 is received, a SS row with SS number 5 is returned. Read blob will return the root blob row. When a request to delete SS with SS timestamp of 2017/04/18 06:52:19 is received, a SS row with SS number 0 will be expired.

Determining Blob Size Based on Delta Size

Figure 4A:
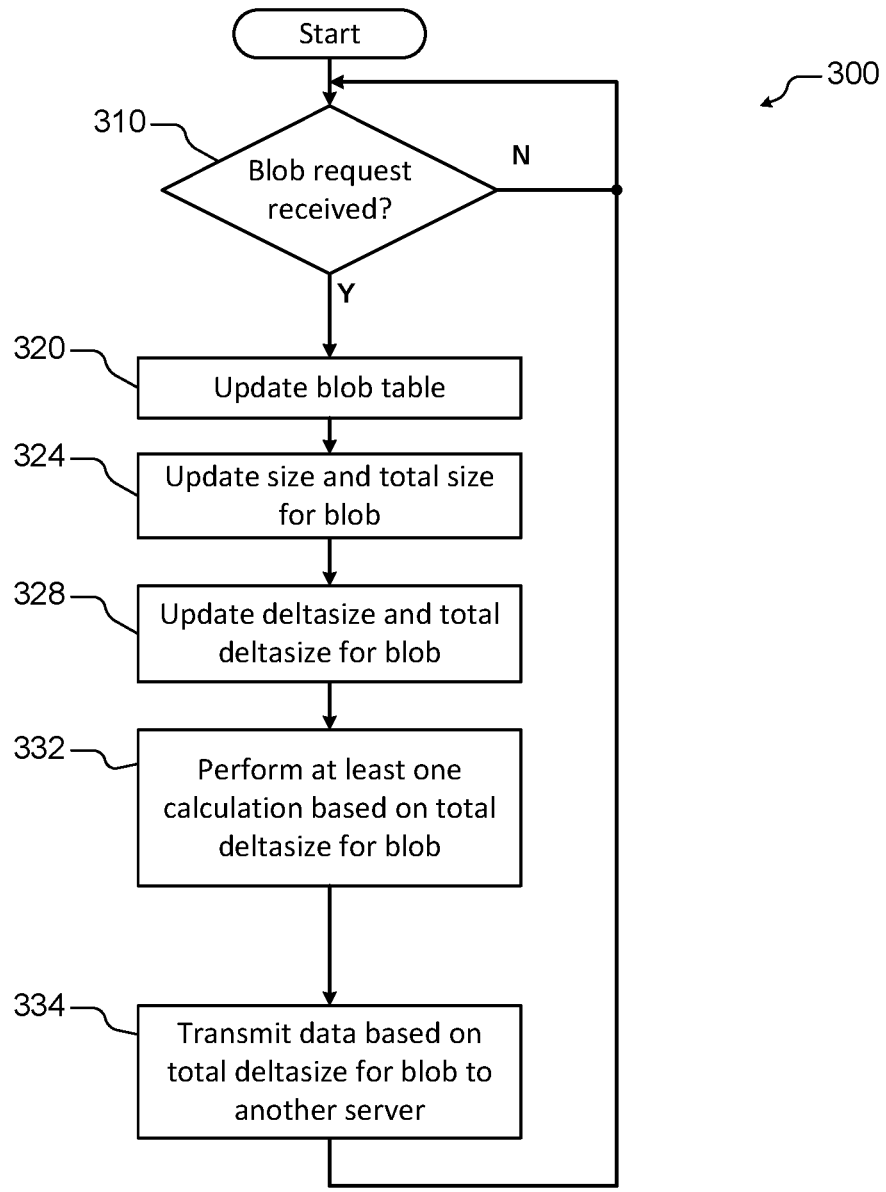
FIG. 4A is a flowchart of an example of a method for generating a delta_size of a blob according to the present disclosure.

Referring now to FIG. 4, a method 300 for determining the blob size based on blob delta_size according to the present disclosure is shown. The delta_size for the blob is less than or equal to the size for a blob. Each blob includes a blob table. Entries in the table (such as SS, SS and/or the root blob) are associated with one or more individual blocks, block lists, pages or indexes. Each of the block lists includes one or more blocks and the blocks can have different sizes or each of the indexes includes one or more pages. Typically, the distributed data storage system stores the blocks/pages for each of the block lists/indexes (even if some of the blocks/pages are shared by more than one block list/index).

In some examples, one or more of the blocks are shared in two or more of the block lists. Normally, the blob size for the blob is based on the count of blocks for the entry in the blob table (since each block list is stored again). If a block appears in more than one of the block lists (e.g. 3 times) for the entry in the blob table, it is counted more than one time (e.g. 3 times in this example) when determining the billing for storage of the blob. The delta_size for the blob described herein, however, counts each distinct block in the block lists only once, which can provide significant savings for the tenant.

When a blob request is received at 310, the method 300 updates the blob table at 320 as described above. At 324, the size for each block list and the total size for the blob are updated. At 328, the delta_size for each block list and the total delta_size for the blob are updated.

At 332, at least one calculation is performed based on at least one of total delta_size for the blob and/or for the corresponding tenant account. For example, the delta_size for all of the blobs for a given tenant are summed or another function is applied.

At 334, the at least one of total delta_size for the blob and/or for the corresponding tenant account is transmitted to another tenant and/or server on an event basis or in response to a request for further processing.

In some examples, the total storage capacity or size for the account can be calculated by summing the total delta_size for each blob in the account. In some examples, billing for the account by the cloud service provider for the tenant's stored data is based at least in part on total delta_size for the blobs in the tenant's account. In some examples, the total delta_size is transmitted to the server 69 and the billing for the tenant's stored data may be remotely generated by the server 69.

Referring now to FIG. 4B, the blob table is shown for an example blob ("file.txt") at time periods T0, T1, T2, and T3. At T0, a blob storage request is received to put block B1, put block B2 and put block list (B1, B2). At this point, there are two blocks (B1, B2) stored for the blob and the delta_size, size, total delta_size and total size are all equal to 2.

At T1, a blob storage request is received to put block B3 and put block list (B3, B2) (which is an overwrite request). At this point, the delta_size and size are equal to 3 and 4, respectively.

At T2, a delete SS T1 request is received. The T1 SS is soft deleted (delete with future delete data). At this point, the delta_size and size are equal to 3 and 4, respectively. At T3, a blob storage request is received to put block B4 and put blocklist (B4,B3,B1) (which is an overwrite request). At this point, the delta_size and size are equal to 4 and 7, respectively. As can be appreciated, the pages and indexes can be handled in a similar fashion.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A cloud storage system, comprising:
a processor; and
a storage device to store blob table management instructions for execution by the processor, wherein the blob table management instructions are configured to:
manage a plurality of storage requests for a blob stored in a storage stamp as snapshots in a blob table;
selectively create a user snapshot of at least one of the snapshots in the blob table; and
when automatic snapshots are enabled:
receive a first request to overwrite the blob; and
if the first request does not further specify a key of the one of the snapshots in the blob table, add a new snapshot to the blob table and maintain storage of a prior snapshot of the blob for a maximum period.

2. The cloud storage system of claim 1, wherein, in response to the first request and in response to automatic snapshots being disabled, the blob table management instructions are further configured to overwrite a snapshot of the blob without creating a new snapshot.

3. The cloud storage system of claim 1, wherein the blob table management instructions are further configured to:
when automatic snapshots are enabled:
receive a second request to delete the blob stored in the blob table; and
if the second request does not further specify a key corresponding to one of the snapshots in the blob table, add a new snapshot to the blob table and maintain storage of the blob for a maximum period.

4. The cloud storage system of claim 3, wherein the blob table management instructions are further configured to add an invisible flag to a snapshot in the blob table.

5. The cloud storage system of claim 3, if the second request further specifies a key corresponding to one of the snapshots in the blob table, the blob table management instructions are further configured to change an expiration of a corresponding snapshot in the blob table to a predetermined period that is less than the maximum period.

6. The cloud storage system of claim 3, wherein, in response to the second request and in response to automatic snapshots being disabled, the blob table management instructions are further configured to delete a snapshot in the blob table without creating a new snapshot.

7. The cloud storage system of claim 1, wherein the blob table management instructions are further configured to promote at least one of the snapshots in the blob table in response to a promotion request.

8. The cloud storage system of claim 1, wherein:
each of the snapshots in the blob table is associated with one of a block list or an index,
each of the block lists includes one or more blocks,
each of the indexes includes one or more pages,
the blob table management instructions are configured to determine a delta size including at least one of a sum of unique blocks in the block lists of the snapshot associated with the blob and unique pages in the indexes, and
the delta size is less than or equal to a total number of blocks in the block lists and the pages in the indexes for each of the snapshots of the blob.

9. The storage stamp of claim 8, wherein the blob table management instructions are further configured to transmit a total delta size for the blob to a remote server.

10. A cloud storage system, comprising:
a front end layer to receive requests to store blobs, wherein each of the blobs includes data;
a partition layer including a blob table manager to manage storage of the blobs using a blob table; and
a storage stamp to store the blobs,
wherein the blob table manager executes instructions configured to manage snapshot of the blobs in the blob table in response to requests to:
store blobs in the blob table;
create snapshot of the blobs in the blob table;
receive a first request to overwrite one of the blobs in the blob table; and
if the first request does not further specify a key of one of the snapshots of one of the blobs, add a new snapshot to the blob table for the one of the blobs and maintain storage of a prior snapshot of the one of the blobs for a maximum period.

11. The cloud storage system of claim 10, wherein, the instructions are configured to:
promote at least one of the snapshots in the blob table;
overwrite snapshots of the blobs in the blob table; and
enable hard delete and soft delete of at least one snapshot of the blobs in the blob table.

12. The cloud storage system of claim 11, wherein, in response to the first request and in response to the automatic snapshot being disabled, the instructions are further configured to overwrite the one of the blobs without creating a new snapshot.

13. The cloud storage system of claim 11, wherein the instructions are further configured to:
when automatic snapshots are enabled:
receive a second request to delete one of the blobs stored in the blob table;
and if the second request does not further specify a key of one of the snapshots of one of the blobs, add a new snapshot to the blob table and maintain storage of the blob for a maximum period.

14. The cloud storage system of claim 13, wherein the instructions are further configured to add an invisible flag to a snapshot of one of the blobs in the blob table.

15. The cloud storage system of claim 13, if the second request further specifies a key corresponding to one of the snapshots for one of the blobs in the blob table, the instructions are further configured to change an expiration of a corresponding snapshot of the one of the blobs in the blob table for a predetermined period that is less than the maximum period.

16. The cloud storage system of claim 13, wherein, in response to the second request and in response to the automatic snapshot being disabled, the instructions are further configured to delete a snapshot of one of the blobs without creating a new snapshot.

17. The cloud storage system of claim 11, wherein:
each of the snapshots in the blob table is associated with one of a block list or an index,
each of the block lists includes one or more blocks,
each of the indexes includes one or more pages,
the blob table management instructions are configured to determine a delta size including at least one of a sum of unique blocks in the block lists of the snapshot associated with the blob and unique pages in the indexes, and
the delta size is less than or equal to a total number of blocks in the block lists and the pages in the indexes for each of the snapshots of the blob.

18. A cloud storage system, comprising:
a front end layer to receive requests for blobs, wherein each of the blobs includes data;
a partition layer including a blob table manager to manage storage of the blobs using a blob table; and
a storage stamp to store the blobs,
wherein the blob table manager executes instructions configured to:
store snapshot in the blob table for each of the blobs in response to storage requests corresponding to the blobs, wherein:
each of the snapshots in the blob table is associated with one of a block list or an index,
each of the block lists includes one or more blocks,
each of the indexes includes one or more pages,
the blob table manager is configured to determine a delta size including at least one of a sum of unique blocks in the block lists of the snapshot associated with the blob and unique pages in the indexes,
the delta size is less than or equal to a total number of blocks in the block lists and the pages in the indexes for each of the snapshots of the blob, and
when automatic snapshots are enabled, to:
receive a first request to overwrite one of the blobs in the blob table; and
if the first request does not further specify a key of the one of the snapshots of one of the blobs, add a new snapshot to the blob table for the one of the blobs and maintain storage of a prior snapshot of the one of the blobs for a maximum period.

19. The cloud storage system of claim 18, wherein the instructions are further configured to transmit the delta size for the blob to a remote server.

20. The cloud storage system of claim 18, wherein the instructions are further configured to:
determine a total delta size for the blobs; and
transmit the total delta size to a remote server.

* * * * *